(12) United States Patent
Bohner et al.

(10) Patent No.: US 9,719,161 B2
(45) Date of Patent: Aug. 1, 2017

(54) METHOD FOR PRODUCING A MOTOR VEHICLE COMPONENT FROM A HARDENABLE ALUMINUM ALLOY

(71) Applicant: Benteler Automobiltechnik GmbH, Paderborn (DE)

(72) Inventors: Friedrich Bohner, Oerlinghausen (DE); Jochen Doerr, Bad Driburg (DE); Jochem Grewe, Salzkotten (DE); Christian Hielscher, Delbrueck (DE); Joern Toelle, Paderborn (DE); Boris Rauscher, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 278 days.

(21) Appl. No.: 14/683,685

(22) Filed: Apr. 10, 2015

(65) Prior Publication Data

US 2016/0053356 A1 Feb. 25, 2016

(30) Foreign Application Priority Data

Aug. 20, 2014 (DE) .......................... 10 2014 111 920

(51) Int. Cl.
*C22F 1/04* (2006.01)
*C22C 21/02* (2006.01)
*C22C 21/10* (2006.01)
(Continued)

(52) U.S. Cl.
CPC .............. *C22F 1/04* (2013.01); *B62D 29/008* (2013.01); *C22C 21/00* (2013.01); *C22C 21/02* (2013.01);
(Continued)

(58) Field of Classification Search
CPC ....................................................... C22F 1/04
(Continued)

(56) References Cited

U.S. PATENT DOCUMENTS

2005/0189044 A1  9/2005  Benedictus et al.
2008/0283163 A1  11/2008  Bray et al.
(Continued)

FOREIGN PATENT DOCUMENTS

CN      102886457 A      1/2013
DE   102009008282 A1     8/2010
(Continued)

OTHER PUBLICATIONS

Hufnagel, W. et al., "Aluminium-Taschenbuch", Aluminium-Verlag, Düsseldorf, 1983, pp. 228, 229, 492-495, 1040-1041(pp. 492-493 translated), 14th edition, Aluminium-Zentrale, Düsseldorf.
CN Appln. No. 201510378620.3, dated Nov. 28, 2016.

*Primary Examiner* — Brian Walck
(74) *Attorney, Agent, or Firm* — Hauptman Ham LLP

(57) ABSTRACT

A method for producing a motor vehicle component includes the steps of providing a precipitation-hardenable blank composed of a 6000 or 7000 grade aluminum alloy, solution-annealing the blank at a temperature between 350° C. and 550° C. for a time period of 2 to 30 min., in particular 3 to 20 min. and preferably 5 to 15 min., in particular at a temperature between 440° C. and 480° C. in the case of a 7000 grade aluminum alloy, and in particular at a temperature between 490° C. and 545° C. in the case of a 6000 grade aluminum alloy, subjecting the solution-annealed blank to partially different quenching, a first region being quenched to a temperature between 150° C. and 250° C., and a further region being quenched to a temperature below 150° C., deforming the blank during or after the partially different quenching.

13 Claims, 3 Drawing Sheets

Figure 1A:
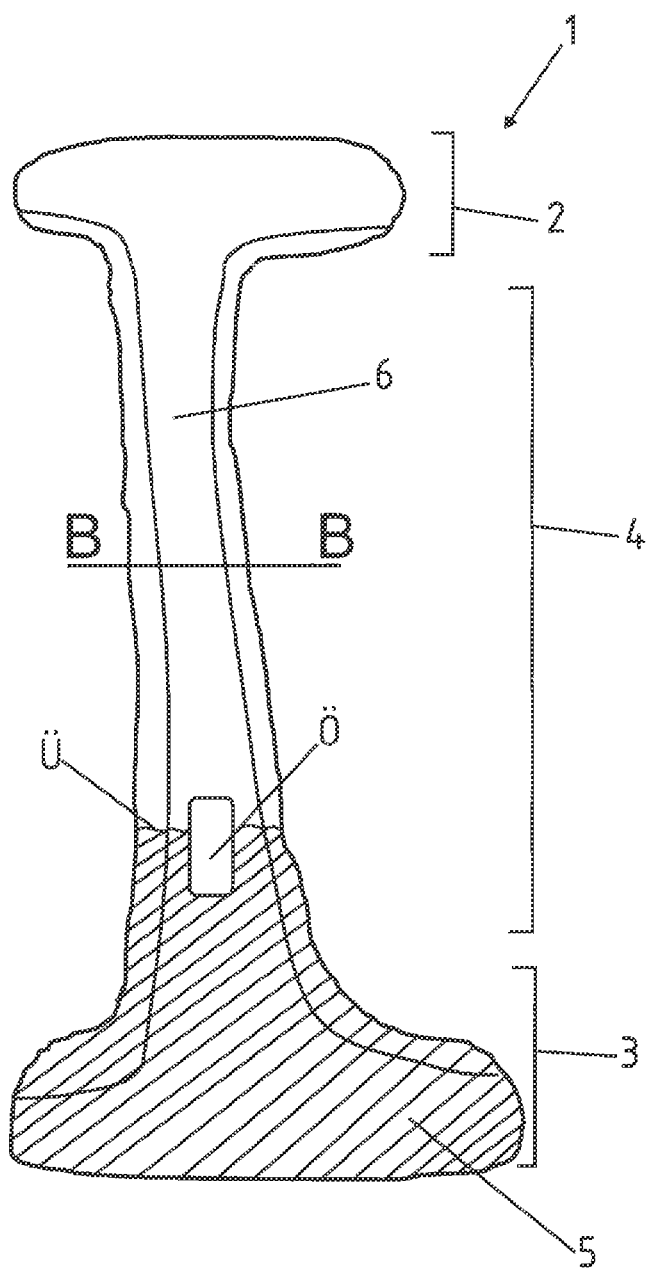

(51) Int. Cl.
*C22F 1/05* (2006.01)
*C22F 1/053* (2006.01)
*B62D 29/00* (2006.01)
*C22C 21/00* (2006.01)
*C22F 1/00* (2006.01)
*C22C 21/08* (2006.01)

(52) U.S. Cl.
CPC .............. *C22C 21/08* (2013.01); *C22C 21/10* (2013.01); *C22F 1/002* (2013.01); *C22F 1/05* (2013.01); *C22F 1/053* (2013.01)

(58) Field of Classification Search
USPC ........................................................ 148/695
See application file for complete search history.

(56) References Cited

U.S. PATENT DOCUMENTS

| | | |
|---|---|---|
| 2010/0218860 A1 | 9/2010 | Doerr et al. |
| 2011/0111081 A1 | 5/2011 | Chen et al. |
| 2011/0297278 A1 | 12/2011 | Xiong et al. |
| 2012/0186706 A1 | 7/2012 | Krajewski |
| 2013/0020000 A1 | 1/2013 | Carter |
| 2013/0216790 A1 | 8/2013 | Smeyers et al. |
| 2014/0069557 A1 | 3/2014 | Smeyers, Sr. et al. |

FOREIGN PATENT DOCUMENTS

| | | |
|---|---|---|
| DE | 102012010471 A1 | 12/2012 |
| DE | 102012212489 A1 | 1/2013 |
| EP | 1530651 A2 | 5/2005 |
| WO | 0248419 A2 | 6/2002 |
| WO | 0248419 A3 | 6/2002 |

B-B

C-C

METHOD FOR PRODUCING A MOTOR VEHICLE COMPONENT FROM A HARDENABLE ALUMINUM ALLOY

RELATED APPLICATIONS

This application claims the benefit of German Application No. 10 2014 111 920.7, filed Aug. 20, 2014, which is incorporated herein by reference in its entirety.

The present invention relates to a method for producing a motor vehicle component from a precipitation-hardenable aluminum alloy, as per the features in patent claim 1.

It is known from the prior art for vehicle components and motor vehicle structural components to be produced from metallic materials. Here, a self-supporting motor vehicle body has imparted to it a level of rigidity required for normal vehicle operation. In recent years, however, the demands on motor vehicle bodies of said type have greatly increased. The focus is no longer just on styling, but is at the same time also on the targeted generation of characteristics in the event of a vehicle crash, and the consequent demands on the lightweight structure.

In this regard, it is known from the prior art to use steel materials with which it is possible to provide components with high-strength or even ultra high-strength characteristics. Said high-strength or ultra high-strength characteristics are produced in targeted fashion in parts of the components.

It is alternatively known to produce motor vehicle components from aluminum. In this case, aluminum is used as a lightweight metal component and, owing to its low inherent specific weight, permits a corresponding weight saving. The production of the aluminum component for motor vehicles is known for example from DE 10 2009 008 282 A1.

It is an object of the present invention, taking the prior art as a starting point, to specify a method for producing a motor vehicle component from a light metal alloy, by means of which method it is possible in an economical and inexpensive manner to produce a motor vehicle component.

The above-stated object is achieved according to the invention by means of a production method according to the features in patent claim 1.

The dependent patent claims relate to advantageous configuration variants.

The method according to the invention for producing a motor vehicle component is characterized by the following method steps:

providing a precipitation-hardenable blank composed of a 6000 or 7000 grade aluminum alloy, preferably having the main alloy elements AlZnMg, AlZnMgCu or AlSiMg, solution-annealing the blank at a temperature between 350° C. and 500° C., in particular at a temperature between 440° C. and 480° C. in the case of a 7000 grade aluminum alloy and at a temperature between 490° C. and 545° C. in the case of a 6000 grade aluminum alloy, for a time period of 2 to 30 min., in particular 3 to 20 min. and preferably 5 to 15 min., subjecting the solution-annealed blank to partially different quenching, a first region being quenched to a temperature between 150° C. and 250° C., and at least one further region being quenched to a temperature below 150° C., deforming the blank during or after the partially different quenching, performing artificial aging by heating and generating a yield strength in at least the first region of less than 200 MPa and greater than 120 MPa and a yield strength in the further region of less than or equal to 550 MPa and greater than 200 MPa, and generating a yield strength delta between two regions of greater than 50, preferably greater than 100 MPa.

With the method according to the invention, it is possible, in particular very efficiently in terms of time, particularly preferably within the cycle time of the production line, to produce an aluminum motor vehicle component with, in parts, regions of mutually different strength. For this purpose, it is the case in particular that the blank composed of a 7000 grade aluminum alloy, preferably with zinc as the main alloy constituent and with a high magnesium content, is provided in the state T4, T6 or T7. The thus provided blank composed of an aluminum alloy is then subjected to solution annealing at a temperature between 350° C. and 500° C., in particular between 440° C. and 480° C., for a time period of 2 to 30 min., in particular 3 to 20 min. and preferably 5 to 15 min. Here, energy is input, owing to the supplied heat, into the crystal lattice of the material. A solid solution is formed, in which atoms occupy lattice sites in a matrix randomly. The yield strength is the RP 0.2 yield strength.

Use may alternatively be made of a blank composed of a 6000 grade aluminum alloy. This is particularly preferably subjected to solution annealing at a temperature between 490° C. and 545° C. for a time period of 2 to 30 min., in particular 3 to 20 min. and preferably 5 to 15 min.

The respective state is frozen by quenching, such that the atoms remained forcibly dissolved in the matrix. The state is also referred to as supersaturated solid solution, which has a thermodynamically unstable state. According to the invention, it is however possible for the blank, for a transition period of up to 1 day after the annealing, to be easily deformable in this state, in particular with high degrees of freedom with regard to shaping. The quenching is thus followed by a forming process. It is however also provided according to the invention that the quenching itself is performed at partially mutually different temperatures. Owing to the quenching at different temperatures, regions with mutually different solid solution states and grain boundary occupancies are already generated, such that mutually different strengths are generated during the subsequent artificial aging process.

The temperatures after the partially different quenching of the first and second regions of the blank are preferably held for a time period of 0.05 to 30 minutes, in particular 0.1 to 20 minutes and preferably 0.2 to 15 minutes.

According to the invention, the artificial aging process is in turn performed with artificial aging by heating of the blank that has been shaped to form the motor vehicle component. Here, a yield strength in at least one first region, hereinafter also referred to as region of the first type, of less than 200 MPa and greater than 120 MPa is generated, and a yield strength in further regions, hereinafter also referred to as second regions or regions of the second type, of less than or equal to 550 MPa and greater than 200 MPa is generated. In this case, the yield strength delta between the regions is greater than 50, preferably greater than 100 MPa. It is furthermore preferable for a yield strength of between 300 and 450 MPa, and particularly preferably a yield strength between 350 and 450 MPa, to be generated in the regions of the second type.

According to the invention, it is in turn possible for the artificial aging of multiple motor vehicle components to be performed in one furnace, such that all of the components are homogenously heated to an artificial aging temperature. It may furthermore be provided that the artificial aging is performed in multiple stages with different temperature-time profiles. The regions of mutually different strength are achieved by way of the different quenching temperatures and different cooling profiles and the holding time for which the solution-annealed blank is held at the respective quenching temperature.

In the context of the invention, it is thus possible in a simple manner, which is efficient from a time and cost aspect, to produce a motor vehicle component composed of aluminum which has regions of mutually different strength. In this case, the motor vehicle component may in particular be formed from a blank of uniform wall thickness. In the context of the invention, it is however also possible for the motor vehicle component to be formed from a blank composed of an aluminum material, wherein the blank has mutually different wall thicknesses. The mutually different wall thicknesses are produced in the blank by way of rolling processing steps or by thermal joining of individual blanks with different wall thicknesses. All of the process steps described above and below can be performed on blanks of homogeneous wall thickness or with mutually different wall thicknesses.

In a preferred configuration variant, it is furthermore possible for the first quenching to a temperature below 250° C. in regions of the first type and to a temperature below 150° C. in regions of the second type to be followed by at least a second quenching stage, it then being the case in the second or a further quenching stage that, in particular, the blank as a whole is quenched to a temperature below 100° C. and in particular to room temperature between 15 and 40° C. This may, in the first quenching stage, be performed in particular in a temperature adjustment station by way of contact cooling which is locally regulated in terms of temperature, this then preferably being followed by complete contact cooling. It may however also be performed, already from the second quenching stage, for example in a quenching tank by complete immersion of the blank.

Following the quenching by means of a single-stage or multi-stage quenching process, the forming (deformation) is then performed at substantially the quenching temperature, or the forming (deformation) is performed at room temperature. The forming at quenching temperature may thus be performed at up to approximately 250° C. in regions of the first type and at up to approximately 150° C. in regions of the second type. In the regions in which quenching is performed with a delay, a relatively high precipitation pressure prevails, with the result that formation of relatively coarse precipitates occurs in parts already during the quenching process, leading to lower strengths during the subsequent artificial aging. In the regions in which more intense quenching is performed, that is to say in the regions of the second type, a solid solution microstructure is formed which is substantially in solution, and the precipitation hardening during the subsequent artificial aging causes fine and substantially homogenously distributed precipitates to form, whereby a higher strength is correspondingly generated.

In the case of the forming being performed at substantially the quenching temperature, regions of the first type and regions of the second type are at mutually different temperatures. In the case of the forming (deformation) being performed at room temperature, this has been brought about either by way of further quenching processes or else alternatively by way of initial storage of the blank that has been subjected to partially different quenching in the first quenching stage. However, the storage should not exceed a time period of 72 hours in the case of the 6000 grade aluminum alloy, and should not exceed a time period of 36 hours in the case of a 7000 grade aluminum alloy, as natural aging of the blank that advances with time reduces the deformability.

It may also be provided according to the invention that the artificial aging is commenced within less than seven days, preferably within less than three days, after theforming. It is thus achieved that the natural aging processes that occur under ambient conditions at room temperature after the forming do not adversely affect the subsequent capacity for generation of the strength characteristics of the component by way of artificial aging.

It is furthermore particularly preferable for the artificial aging to be performed in multiple stages, in a first stage artificial aging being performed for a time period of 6 to 24 hrs., at 80 to 150° C., particularly preferably 80-120° C., and in a subsequent second stage artificial aging being performed for a time period of 6 to 24 hrs. at 100° C. to 200° C., particularly preferably 100-150° C. The first and/or second stage may also be divided into further intermediate stages. Through the selection, according to the invention, of a single-stage or multi-stage artificial aging process and the parameters of time and temperature, it is thus possible for the desired strength characteristics in the deformed aluminum blank to be generated in locally targeted fashion by way of the artificial aging process owing to the partial quenching carried out prior to that.

It is alternatively also possible for the artificial aging that follows the forming to be performed in a time period of 5 to 24 hours at a temperature between 100° C. and 200° C., in particular 140° C. to 160° C. All motor vehicle components produced by forming of the blank can thus be stored in a furnace.

It is furthermore particularly preferable for the blank to be subjected to surface treatment, with the blank preferably being coated and very particularly preferably conversion-coated. In the context of the invention, it is however also conceivable for the motor vehicle component to be coated after the forming of the blank.

In particular, with the method according to the invention, a motor vehicle pillar composed of an aluminum alloy is produced, wherein the motor vehicle pillar is furthermore coupled to reinforcement, closure and/or connection panel parts. Said components are applied after the completion of the forming process. Said components constitute in particular inner and/or outer reinforcement panels. The inner reinforcement panel may for example be applied in the form of a patch to the motor vehicle component that has been produced, in particular the motor vehicle pillar.

In the context of the invention, it is however also possible for a corresponding hollow component to be produced by way of the inner reinforcement panel and/or the outer reinforcement panel. The reinforcement panel is in particular also an aluminum component. The reinforcement panel may however also be applied in the form of a steel component, or composed of fiber composite material. The reinforcement panel is particularly preferably adhesively bonded to the motor vehicle component, in particular the motor vehicle pillar, preferably by way of an adhesive that can be thermally activated. In the context of the invention, it is however also possible for the two components to be welded to one another. Positively locking coupling methods such as riveting, in particular punch riveting, or a clinching process are also possible. It is also possible to perform a rivet welding process or a combination of spot welding and adhesive bonding.

Figure 1B:
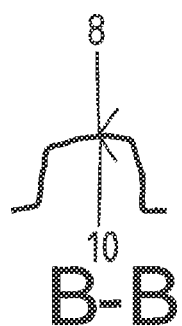
Figure 2A:
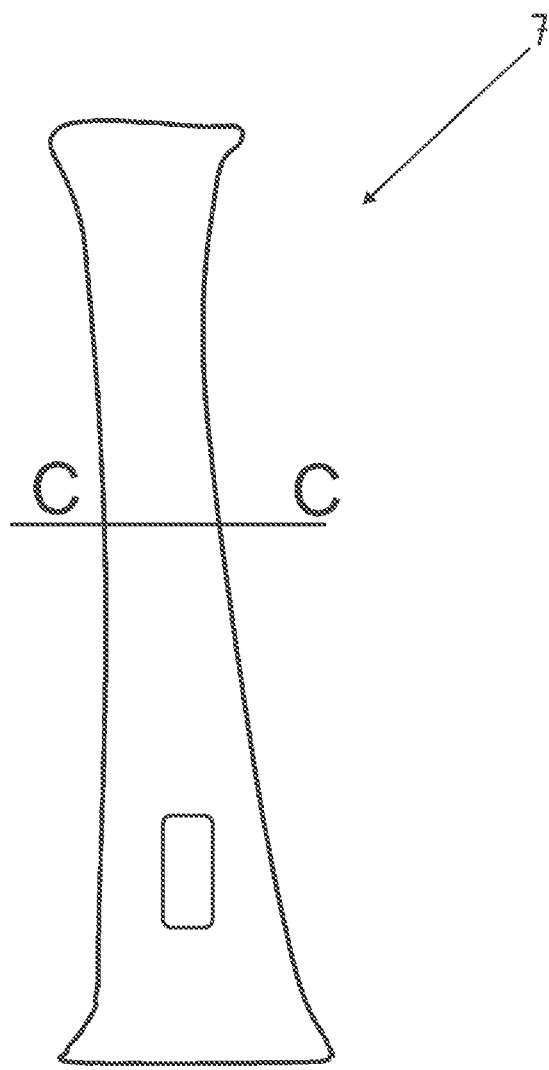
Figure 2B:
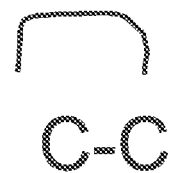

Further advantages, features, characteristics and aspects of the present invention will be discussed in the following description and illustrated in the schematic figures. Said figures serve to give a clearer understanding of the invention. In the figures:

FIGS. 1a and 1b show a side view and a cross-sectional view of a motor vehicle B pillar produced according to the invention, FIGS. 2a and 2b show an outer reinforcement panel for a motor vehicle B pillar as per FIG. 1, and FIGS. 3a to 3c show an inner reinforcement panel.

In the figures, the same reference signs are used for identical or similar components, even if a repeated description is omitted for simplicity.

FIG. 1a shows a motor vehicle component 1 according to the invention in the form of a B pillar, in a side view. The B pillar has a head region 2 for connection to a roof beam (not illustrated in any more detail) and a foot region 3 for connection to a side sill (not illustrated in any more detail). Between the head region 2 and the foot region 3 there extends a central section 4 with an opening Ö. According to the invention, it is now the case that the foot region 3 and a lower part of the central section 4 are formed as a first region 5 which, during the partially different quenching and possible forming, is preferably held at 150-250° C. for a time period of 0.05 to 30 min., in particular 0.1 to 20 min. and preferably 0.2 to 15 min., such that a relatively soft or relatively ductile microstructure is generated here. The upper central section 4 and the head region 2 are in this case formed as a second region 6, which has harder characteristics than the first region 5 and has a yield strength of between 350 MPa and 450 MPa. The first region 5 and further or respectively second region 6 are separated by a transition Ü which extends over 0.1 mm to 80 mm, preferably 1 mm to 50 mm. FIG. 1b shows a cross section as per the section line B-B, such that it can be seen that, during the forming process, at least the central section 4 has been formed in the manner of a hat-shaped profile in cross section. The component has thus been three-dimensionally shaped.

Furthermore, FIGS. 2a and b illustrate an outer reinforcement panel 7 in a side view and in a cross-sectional view. The outer reinforcement panel 7 has a substantially homogeneous cross-sectional profile and is, as per FIG. 1b, in the form of a U-shaped reinforcement panel. This is, as per FIG. 2b, in the form of an outer reinforcement panel 7 which is of U-shaped cross section. This is applied to the outer side 8, as per FIG. 1b, of the motor vehicle component 1, in particular by adhesive bonding, particularly preferably by way of an adhesive that can be thermally activated.

Figure 3A:
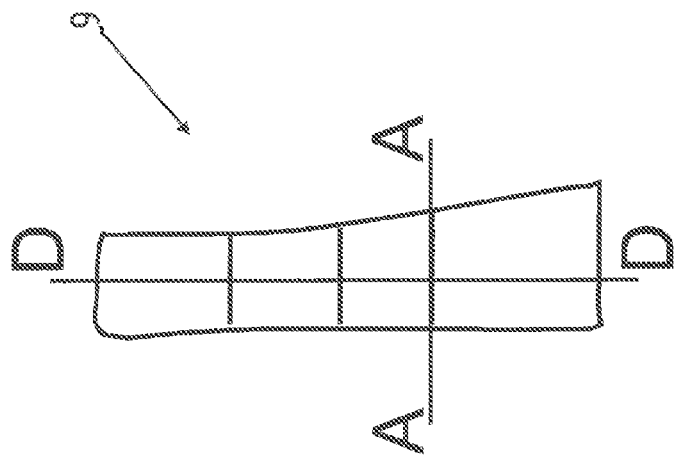
Figure 3B:
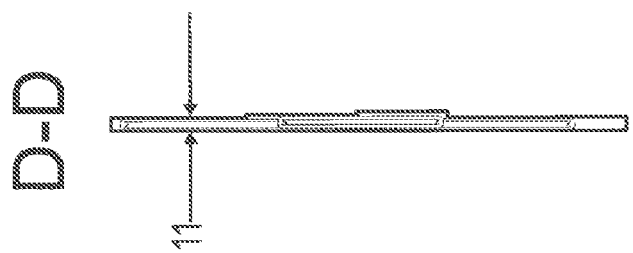
Figure 3C:
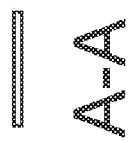

FIGS. 3a to c furthermore illustrate an inner reinforcement panel 9, which is illustrated in a side view in FIG. 3a, in a longitudinal section in FIG. 3b, and in a transverse section in FIG. 3c. The inner reinforcement panel 9 is applied to an inner side, as per FIG. 1b, of the B pillar. Along the longitudinal section line D-D, the inner reinforcement panel 9 has mutually different wall thicknesses 11 in parts over the longitudinal profile. The cross-sectional profile illustrated in FIG. 3c follows section line A-A, wherein said cross-sectional profile is of homogeneous form. The inner reinforcement panel 9 is applied to the inner side 10 as per FIG. 1b, preferably by adhesive bonding.

REFERENCE SIGNS

1—Motor vehicle component
2—Head region
3—Foot region
4—Central section
5—First region
6—Further region
7—Outer reinforcement panel
8—Outer side of 1
9—Inner reinforcement panel
10—Inner side of 1
11—Wall thickness
Ö—Opening
Ü—Transition

The invention claimed is:

1. A method for producing a motor vehicle component, comprising:
   providing a precipitation-hardenable plate made from a 6000 or 7000 aluminium alloy;
   solution annealing the plate for a period of 2 to 30 minutes,
      at a temperature between 440° C. and 480° C. for the 7000 aluminium alloy, or
      at a temperature between 490° C. and 545° C. for the 6000 aluminium alloy;
   partially different quenching of the solution annealed plate, wherein a first region is quenched to a temperature between 150° C. and 250° C. and at least one second region is quenched to a temperature below 150° C.;
   forming the plate during or after the partially different quenching; and
   artificial aging by heating and setting
      a yield strength greater than 120 MPa and less than 200 MPa in at least the first region,
      a yield strength greater than 200 MPa and less than or equal to 550 MPa in the second region, and
      a yield strength delta of greater than 50 MPa between the first and second regions.

2. The method according to claim 1, wherein
the partially different quenching is carried out in a tempering station.

3. The method according to claim 1, wherein
the temperatures after the partially different quenching of the first and second regions of the plate are held for a period of 0.05 to 30 minutes.

4. The method according to claim 1, further comprising, before the forming,
a second quenching, in which the entire plate is quenched to a temperature below 100° C.

5. The method according to claim 1, wherein
the forming is carried out at substantially the quenching temperature or at room temperature.

6. The method according to claim 1, wherein
the artificial aging is carried out in one step for a period of 5 to 24 hours at a temperature between 100° C. and 200° C.

7. The method according to claim 1, wherein
the artificial aging is carried out in multiple steps including
   a first step in which the artificial aging is carried out for a period from 6 to 24 hours at 80 to 150° C., and
   a subsequent step in which the artificial aging is carried out for a period from 6 to 24 hours at 100° C. to 200° C.

8. The method according to claim 1, wherein
the plate is surface treated.

9. The method according to claim 1, wherein
a motor vehicle pillar, a roof strap, a front or rear side member, a bumper in the upper or lower load path, a sill, a cross brace or a door reinforcement is produced from aluminium.

10. The method according to claim 1, wherein
the motor vehicle component is coupled to at least one reinforcing plate, and
the reinforcing plate has regions of different strength produced, or the reinforcing plate has a homogenous strength.

11. The method according to claim 1, wherein
during the forming, the plate is quenched to a temperature below 100° C.

12. The method according to claim 1, wherein
the artificial aging is started within less than seven days after the forming.

13. The method according to claim 1, wherein
in the second region, the yield strength is set between 300 MPa and 450 MPa.

* * * * *